Figure 1:
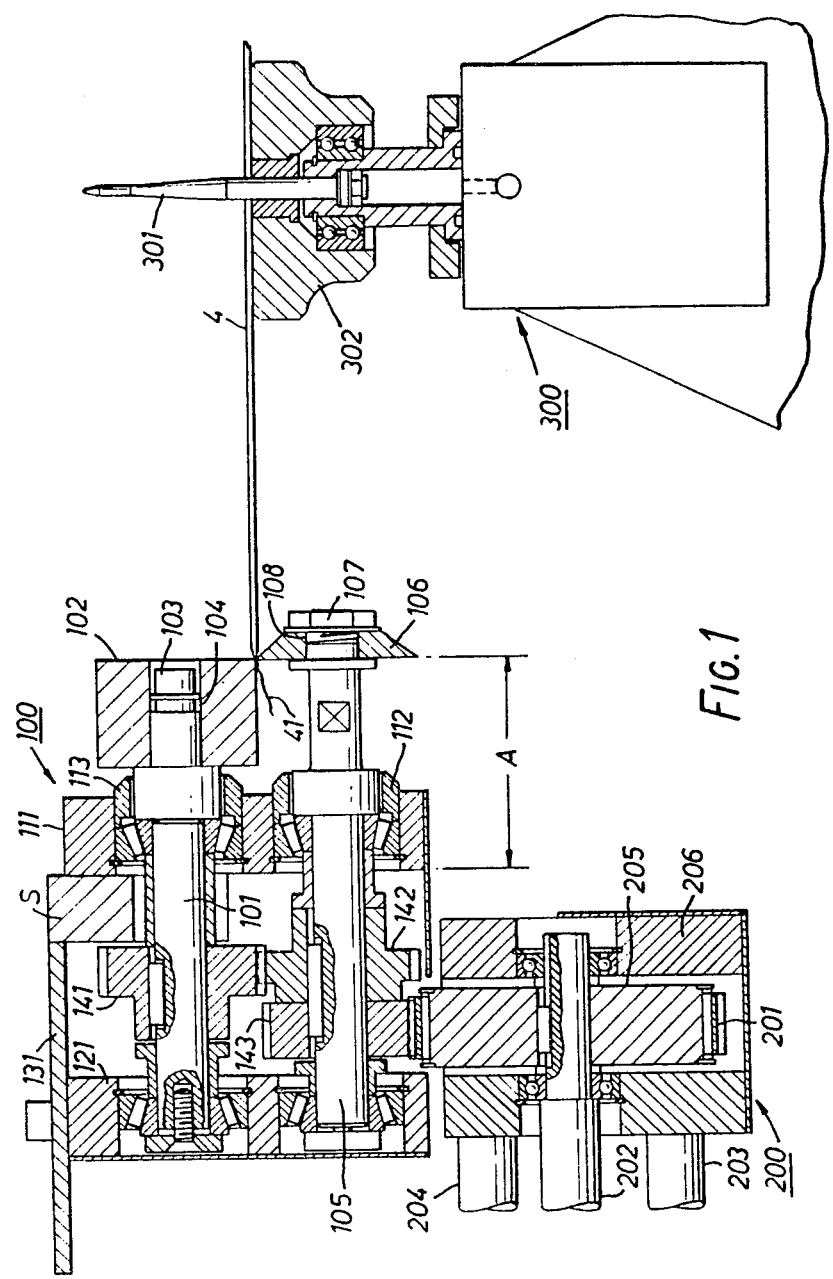

United States Patent [19]

Strausfeld

[11] 4,235,136
[45] Nov. 25, 1980

[54] TRIMMING DISC RECORDS
[75] Inventor: Hermann Strausfeld, Cologne, Fed. Rep. of Germany
[73] Assignee: EMI Electrola Gesellschaft mit beschrankter Haftung, Cologne Braunsfeld, Fed. Rep. of Germany
[21] Appl. No.: 955,573
[22] Filed: Oct. 30, 1978
[30] Foreign Application Priority Data
Nov. 1, 1977 [GB] United Kingdom ............... 45371/77
[51] Int. Cl.³ ............................................. B23B 5/14
[52] U.S. Cl. ........................................ 82/57; 82/1.1; 82/70.1; 82/90; 425/810
[58] Field of Search ..................... 82/1.1, 58, 57, 53.1, 82/53, 90, 83, 70.1; 425/810

[56] References Cited
U.S. PATENT DOCUMENTS

| | | | |
|---|---|---|---|
| 3,186,029 | 6/1965 | Joseph | 82/1.1 X |
| 3,663,136 | 5/1972 | Westermann | 425/810 |
| 3,862,815 | 1/1975 | Roczynski | 425/810 |
| 4,140,035 | 2/1979 | Pullen | 82/58 |

FOREIGN PATENT DOCUMENTS 2016749  10/1971  Fed. Rep. of Germany ........... 425/810

Primary Examiner—Leonidas Vlachos
Attorney, Agent, or Firm—Fleit & Jacobson

[57] ABSTRACT

A record transfer press including an apparatus for trimming flash from a disc record, said apparatus having a relatively movable drive means and trimming head.

10 Claims, 2 Drawing Figures

TRIMMING DISC RECORDS

This invention relates to the making of disc records and especially to the trimming of flash therefrom.

Many techniques for trimming flash are known, three main groups being the punch trimmer, the hot knife trimmer and the wheel trimmer. Hitherto, however, the systems proposed had to be dismantled to remove them from the press for servicing or repair, and this, of course, resulted in lost production time.

It is the object of the invention to provide an improved trimmer arrangement suitable for use in a transfer record press.

In a transfer record press, a shot of plastics material is extruded at a first station, transferred by a first operation to a second station at which it is pressed into disc record form, thence by a second operation to a third station where flash is trimmed and finally to a packaging point. The transfer means is a sled which simultaneously effects all three operations by moving between a "home" position and an outward position in register with the second station, third station and packaging point, and then returning to the home position when the extrusion, pressing and trimming processes are again resumed at their respective stations.

An example of such a press is described in U.S. Pat. No. 4,038,009.

According to the invention there is provided a record transfer press comprising a transfer device adapted to move from a first to a second position on the body of the press to thereby transfer an untrimmed record from the pressing station to the flash trimming station, and also adapted to move back to said first position to receive an untrimmed record, and an apparatus for trimming a record, transferred to the trimming station, comprising a drive unit fixedly attached to the body of the press and disposed adjacent to the trimming station, and a trimming head mounted to said transfer device to move therewith, said trimming head being adapted to drivingly engage the drive unit to trim a transferred record when the transfer device assumes the said first position.

The trimming head may be a wheel trimmer.

A more effective cutting performance may be achieved if during trimming the cutter wheels are offset, from a line, perpendicular to the longitudinal axis of the press, through the centre of the untrimmed record on the trimming station. The offset may lie between 2 and 10 mm although an offset of between 3 and 5 mm is to be preferred.

Since the trimming head is separate from the drive means, it is an attractive feature of the invention that the trimming head may be readily detached, as hereinafter described, from the transfer means to allow servicing of the cutter wheels, for example. By readily detached we mean that the trimming head may simply be unclamped from a preset bracket, or similar means, without a need to dismantle the mechanism necessary for its trimming operation, thereby minimising lost production time. A replacement trimming head may just as easily be fitted to the transfer means.

The path described by the trimming head as it approaches the untrimmed record may be substantially tangential to the circumference of the disc when trimmed and the drive means may be arranged to drive the trimming head before meeting the untrimmed disc thereby reducing the risk of the flash folding over and the cutter failing to trim the disc.

The drive means may be a driven belt with which the trimming head is engaged and the belt may be toothed to engage with a suitable gear of the trimming head.

Figure 2:
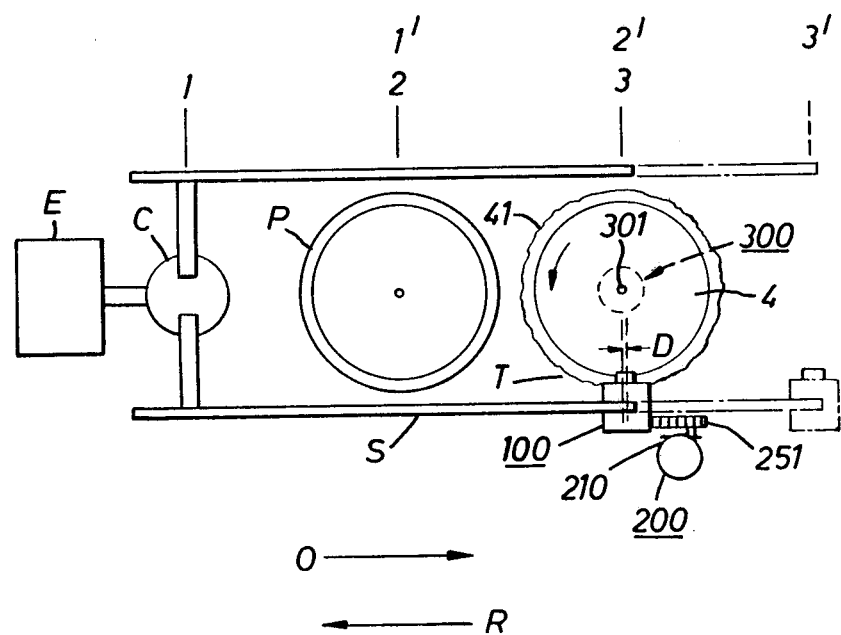

Embodiments of the invention will now be described with reference to the accompanying drawings in which FIG. 1 shows a sectional view of transfer record press disc record trimmer and FIG. 2 shows an outline sketch of an automatic record press having a trimmer as shown in FIG. 1.

The trimmer has two main parts: one, the trimming head, 100, mounted on the record press transfer means, such as a "sled", and the other, the drive means, 200, mounted on the record press frame. The drive means is mounted on the frame adjacent the record trimming position where a spindle and turntable, 300, are provided to receive a disc for trimming. The trimming head is mounted on a transfer means or "sled" so that the head engages the drive means when the sled is at the "home" position, as hereinbefore described.

Considering the trimmer in detail with reference to FIG. 1 of the drawing, which is in a plane transverse of the "sled", a cross-section of a portion of a sled side member is shown at "S". The underside of member S is notched to accommodate a shaft, 101, of the trimming head. The trimming head has a frame of a U-shaped bracket having side limbs 111, 121, in which the shaft, 101, and parallel shaft, 105, are journalled by taper roller bearings held in place by circlips. The limbs are joined by a part, not shown, forming the base of the U and extending between them in a plane in front of and parallel to the drawing.

The base of the U is slotted to receive the outer end of side member S. A bolt secures the bracket to the side member. The bracket is further secured by bolts which pass through side limb, 111, into member S. Additionally, plate 131 is secured to side limb, 121, and abuts member S to stiffen side limb, 121, against movement. In this way the U-shaped bracket is releasably mounted on the end of the sled and the mounting position is accurately repeatable by the engagement of the end of member S in the slotted base of the bracket. The arrangement described provides a rigid housing for the cutter wheels while being easily and accurately fitted to the record press.

The shaft, 101, carries a large cutter wheel, 102, secured by bolt, 103, and collet, 104, and shaft, 105, carries a small cutter wheel, 106, secured by bolt, 107, and collet, 108. Preferably wheel, 102, is of cylindrical form and wheel, 106, of conical form, as is well known in the art. Gears, 141 and 142, are keyed to shafts, 101 and 105, respectively to couple the shafts for contra rotation at equal speed. Shaft, 105, also carries a gear, 143, which is engageable with a double-sided toothed belt, 201. Rotation of gear, 143, by a drive from belt, 201, causes cutter wheels, 102, 106, to rotate at equal speed in opposite direction. Thrust bearings, 112, 113, are provided on shafts 105 and 101.

The drive means is powered by a suitable prime mover which in the illustrated embodiment includes an electric motor (210, FIG. 2) and gear-box, not shown, which are mounted on the frame, not shown, of the record press. The output shaft, 202, of the gear-box carries a gear-wheel, 205, which is of a form to engage the inner toothed surface of the double-sided toothed belt, 201.

A further idler gear-wheel is provided spaced from wheel, 205, in frame, 206. The belt, 201, extends with horizontal upper and lower sections between the gear-wheels. The frame, 206, is attached to the drive means by studs, 203, 204.

In the drawing, the trimming head is shown in operative relation with the drive means and a record, 4, formed with flash, 41, attached and placed on spindle, 301, of the trimming station, 300. In the illustrated embodiment the record with flash attached is released to drop down spindle, 301, onto a small turntable, 302, by the action of the sled. After this movement of the sled back to the "home" position brings gear-wheel, 143, of the trimming head, 100, into engagement with the toothed outer surface upper section of the double-sided belt, 201. The belt is driven by the rotation of gear-wheel, 205, to drive the cutter wheels, 102, 106, as mentioned above. Preferably, the gear-wheel, 143, runs along the belt upper section as the sled returns to the "home" position so that the cutter wheels are turning as they engage the flash, 41, chordally to cut through it and drive the disc, 4, round on turntable, 302, to trim off the flash, 41, all the way round the disc. Preferably, also the point at which the cutter wheels trim the flash is offset a small amount along a longitudinal axis of the press, e.g. 2 to 10 mm from the position of spindle, 301, (D in FIG. 2).

FIG. 2 shows an outline of an automatic record press arranged as described above. The sled S transfer between three work stations viz. from shot forming, C, to pressing, P, to trimming, T, in known manner. The shot is extruded by extruder, E. At the home position the transfer portions 1, 2, 3, of the sled are at stations C, P and T respectively. On the outward stroke, arrow O, the extruded shot with labels applied from station C is transferred to pressing station P, and the disc 4 formed with flash 41 attached transferred from pressing station P, to trimming station T, the sled portions 1, 2, 3 moving to positions 1', 2', 3' respectively. By this time any previously trimmed disc has been unloaded from trimming station T, in any suitable manner, not shown, but well known in the art, e.g. a vacuum transfer device. At the outward sled position the record with flash attached is released to the trimming station T. As the sled returns, arrow R, the trimming head, 100, engages the moving belt, 201, of drive means, 200, causing the cutter wheels to revolve. Just before reaching the home position, i.e. 3, the trimming head cuts through the flash, 41, and causes the disc, 4, to turn. The trimming head stops so that the cutter wheels are about 4 mm short of the spindle, 301, (distance D). The continued movement of belt, 201, by drive means, 200, trims all the flash from the disc.

At the same time as the disc is being trimmed, a shot is being formed and a disc pressed from a previous shot. It will be apparent that trimming takes place during the same part of the cycle as shotforming and pressing. Thus the three time consuming actions can take place at the same time.

A most important feature of the invention is the ease with which the trimming head is removable from the press without the need to dismantle the drive, etc. By removing the trimming head the cutting action of the cutting wheels can be set up away from the press and the prepared head simply clamped to the sled with only a short interruption to its operation, no adjustment being required as the position is set by the slotted bracket. The wearing parts, the cutter wheels, can be changed and sharpened without loss of press production as another trimming head can be installed meanwhile.

The trimming head is designed for long accurate use, the shaft bearings being preloaded against the cutting load and the cutting wheels have carbide cutting edges and surfaces. As the trimming head is only driven in the immediate vicinity of the trimmer, the wear is reduced and the cordal cutting line at which the wheels initially cut into the flash reduces the risk of "fold over" of the flash and failure to trim, possible with an arcuate initial cutting line.

What I claim is:

1. In a record transfer press the combination comprising,
   a transfer device adapted to move from a first to a second position on the body of the press to thereby transfer an untrimmed record from the pressing station to the flash trimming station, and also adapted to move back to said first position to receive an untrimmed record, and
   an apparatus for trimming a record, transferred to the trimming station, comprising a drive unit fixedly attached to the body of the press and disposed adjacent to the trimming station, and a trimming head mounted to said transfer device to move therewith, said trimming head being adapted to drivingly engage the drive unit to trim a transferred record when the transfer device assumes the said first position.

2. In a record transfer press according to claim 1 in which the trimming head is a wheel trimmer.

3. In a record transfer press according to claim 2 wherein the cutter wheels of the wheel trimmer approach the trimming station along a first axis and are arranged so that when the transfer device assumes said first position the wheels are offset from a second axis, orthogonal to the first axis, passing through the centre of the untrimmed record at the trimming station.

4. In a record transfer press according to claim 3 in which the said offset is between 2 and 10 mm.

5. In a record transfer press according to claim 4 in which the said offset is between 3 and 5 mm.

6. In a record transfer press according to claim 1 in which the trimming head approaches the untrimmed disc record along a path substantially tangential to the circumference of the disc when trimmed.

7. In a record transfer press according to claim 1 in which the drive means is arranged to drive the trimming head prior to it meeting the untrimmed disc record to thereby cut through the flash chordally.

8. In a record transfer press according to claim 1 in which the said drive means is a driven belt with which the trimming head is engaged.

9. In a record transfer press according to claim 8 in which the said belt is toothed to engage with a suitable gear of the trimming head.

10. In a record transfer press according to claim 1, wherein the trimming head is detachably mounted to said transfer device.

* * * * *